A. L. ARTHUR.
TRAIN PIPE COUPLING.
APPLICATION FILED APR. 2, 1915.
1,171,380.
Patented Feb. 8, 1916.
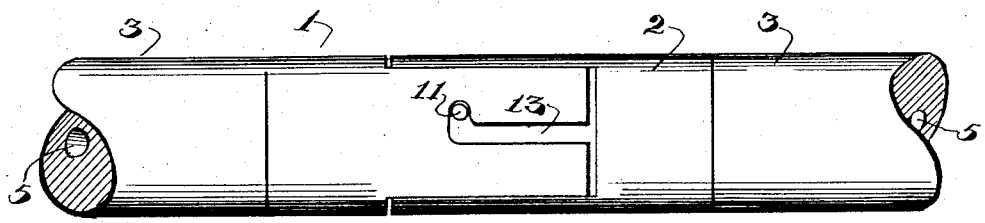
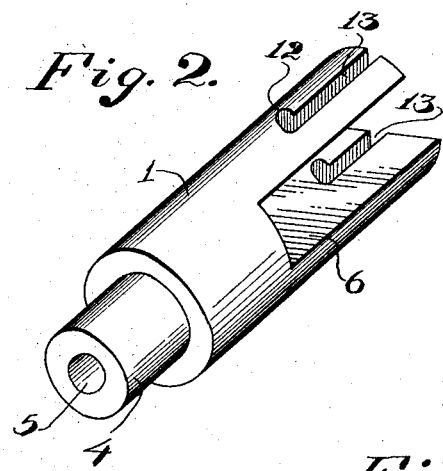
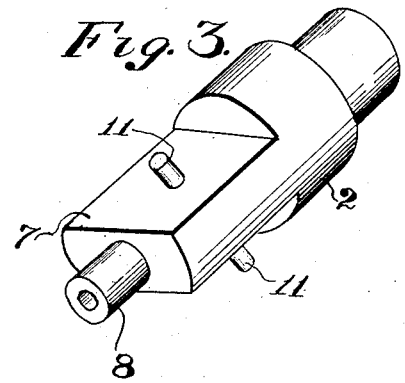
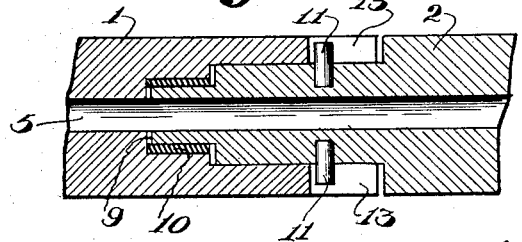
Witnesses
Inventor
A. L. Arthur
By
Attorney

UNITED STATES PATENT OFFICE.

ALBERT L. ARTHUR, OF UKIAH, CALIFORNIA, ASSIGNOR OF ONE-HALF TO W. D. L. HELD, OF UKIAH, CALIFORNIA.

TRAIN-PIPE COUPLING.

1,171,380.      Specification of Letters Patent.      Patented Feb. 8, 1916.

Application filed April 2, 1915. Serial No. 18,771.

*To all whom it may concern:*

Be it known that I, ALBERT L. ARTHUR, a citizen of the United States, residing at Ukiah, in the county of Mendocino and State of California, have invented certain new and useful Improvements in Train-Pipe Couplings; and I do hereby declare the following to be a full, clear, and exact description of the invention, such as will enable others skilled in the art to which it appertains to make and use the same.

The invention relates to improvements in train pipe couplings.

The object of the present invention is to improve the construction of train pipe couplings and to provide a simple, practical, and efficient train pipe coupling of strong and durable construction designed for connecting the flexible hose of the air brake pipes and other pipes of a train and capable of enabling such flexible hose or section to be quickly connected and disconnected with greater ease and rapidity than is possible with the ordinary train pipe coupling.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of a train pipe coupling constructed in accordance with this invention, Fig. 2 is a perspective view of one of the sections or members of the couplings, Fig. 3 is a perspective view of the other section or member of the coupling, Fig. 4 is a horizontal sectional view through the coupling.

Like numerals of reference designate corresponding parts in all the figures of the drawings.

In the accompanying drawing in which is illustrated the preferred embodiment of the invention, 1 and 2 designate sections or members of tubular form and preferably of a diameter corresponding with the diameter of the flexible sections or hose 3 which are connected with the air brake pipes or other pipes of the train. The sections or members 1 and 2 have reduced terminal portions 4 forming nipples and adapted to be secured in the outer ends of the flexible hose 3 which carry the sections or members 1 and 2 of the coupling. The sections or members 1 and 2 are provided with longitudinal bores or passages 5 and the section or member 1 is bifurcated at its outer portion to form a longitudinal slot or opening 6 having vertical side walls and receiving a laterally reduced portion 7 of the other section or member 2 of the coupling.

The reduced portion 7 of the section or member 2 has flat side faces and fits snugly in the slot or bifurcation of the coacting section or member and it is also provided with a reduced terminal point 8 of cylindrical form fitting in a socket or enlargement 9 formed by enlarging or counterboring the outer end of the passage 5 of the section or member 1. The socket 9 receives a gasket 10 of rubber or other suitable material to form an air tight connection between the members of the coupling and also to permit a limited relative rocking movement of the section sufficient to enable laterally projecting lugs 11 of the section or member 2 to be engaged with and disengaged from notches or recesses 12 formed in the upper walls of longitudinal slots 13 at the inner ends thereof.

The lugs 11 extend laterally from the flat faces of the reduced portion 7 of the section or member 2 of the coupling and the sides of the slotted or bifurcated portion of the other section of the coupling is provided with the said slots 13 which extend inwardly from the outer end of the said sides as clearly illustrated in Fig. 2 of the drawing. The sections or members of the coupling are quickly connected by introducing the point or nipple in the socket and simultaneously sliding the lugs along the slots 13 which will guide the point or nipple 8. The yieldable character of the gasket will permit the laterally projecting lugs to be readily sprung into and out of engagement with the notches or recesses 12 and the weight of the sections or members of the coupling will maintain the lugs in engagement with the notches or recesses 12 when the parts are coupling. By simply lifting the coupling with a slight pivotal movement, the lugs are readily disengaged from the notches or recesses 12.

It will be seen that the train pipe coupling is exceedingly simple and inexpensive in construction and that it will enable the hose

What is claimed is:—

1. A train pipe coupling including two interfitting sections, one of the sections being provided with a longitudinal bifurcation and having longitudinal slots in the sides of the bifurcation, the upper walls of the slots being provided with notches and a coacting section or member having a laterally reduced portion to fit the said bifurcation and provided with laterally projecting lugs slidable along the said slots and arranged to engage the notches whereby the sections will be interlocked and held against outward movement and maintained in their interlocked relation by gravity.

2. A train pipe coupling of the class described including a section or member having a longitudinal bifurcation and provided with a socket at the inner end thereof, said sections being also provided at opposite sides of the bifurcation with longitudinal slots and having notches in the walls of the slots and a coacting section or member laterally reduced to fit the bifurcation and provided with a point or nipple arranged in the said socket, the laterally reduced portion of the section or member being also provided with laterally projecting lugs slidable in the said slots and engaging the notches and a yieldable gasket surrounding the point or nipple and arranged in the said socket, said gasket permitting a limited rocking movement of the sections to engage the lugs with the notches and disengage them therefrom without affecting the air tight connection between the sections or members.

In testimony whereof I affix my signature in presence of two witnesses.

ALBERT L. ARTHUR.

Witnesses:
W. D. L. HELD,
W. G. PAAGE.

Copies of this patent may be obtained for five cents each, by addressing the "Commissioner of Patents, Washington, D. C."